May 4, 1926.

N. W. BRANNON 1,583,752

THREAD CUTTING TEMPLE FOR LOOMS

Filed Jan. 4, 1926

Inventor.
Nem William Brannon
by Heard Smith & Tennant
Attys.

Patented May 4, 1926.

1,583,752

UNITED STATES PATENT OFFICE.

NEM WILLIAM BRANNON, OF GREER, SOUTH CAROLINA, ASSIGNOR TO DRAPER CORPORATION, OF HOPEDALE, MASSACHUSETTS, A CORPORATION OF MAINE.

THREAD-CUTTING TEMPLE FOR LOOMS.

Application filed January 4, 1926. Serial No. 79,072.

*To all whom it may concern:*

Be it known that I, NEM WILLIAM BRANNON, a citizen of the United States, and a resident of Greer, county of Greenville, State of South Carolina, have invented an Improvement in Thread-Cutting Temples for Looms, of which the following description, in connection with the accompanying drawing, is a specification, like characters on the drawing representing like parts.

This invention relates to thread cutting temples for looms such as is commonly employed for severing the filling ends close to the selvage which are left extending therefrom during the weaving operation.

The invention relates particularly to that type of thread cutting temple in which the cutting mechanism comprises a fixed cutting member and a rotatable cutter which cooperates therewith to effect the severing action.

Thread cutting temples embodying a rotatable thread cutting member have usually been provided with resilient means for forcing the stationary cutting member against the rotatable cutting member to insure proper severance of the filling end. Friction thus produced retards the free rotation of the temple roll and causes undesirable marking of the fabric by the pins of the temple roll.

The principal object of the present invention is to provide a thread cutting temple having cooperating stationary and rotatable cutting means which will insure the severance of the filling end without substantial retardation of the free rotation of the temple roll.

More particularly an object of the invention is to provide a thread cutting temple with a plurality of rotatable cutting members having coincident teeth cooperating with a stationary cutting member to insure proper severance of the filling.

A further object of the invention is to provide a thread cutting temple of the type above described with a stationary cutting blade so mounted that it can be readily removed for sharpening or replacement.

A further object of the invention is to provide means for so mounting the stationary cutting blade that it will assist in preventing undesirable axial longitudinal movement of the thread cutting roll.

Another feature of the invention consists in providing a rotatable thread cutting member comprising a plurality of parallel toothed thread cutting disks having coincident teeth and provided with an integral sleeve adapted to be inserted axially into and secured within the usual wooden tooth-studded roll.

Other objects and features of the invention will more fully appear from the following description and the accompanying drawings and will be particularly pointed out in the claims.

Figure 1:
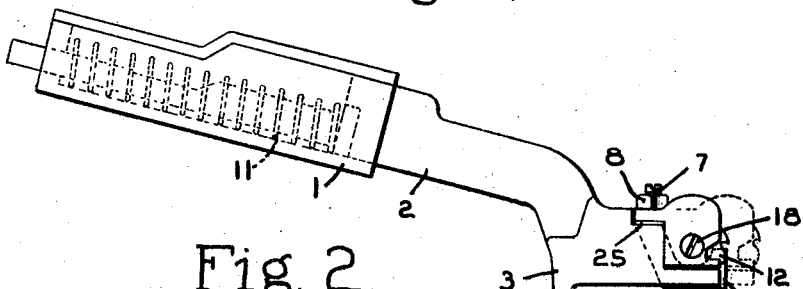
Fig. 1 is a side elevation of a thread cutting temple embodying a preferred form of the present invention.
Figure 2:
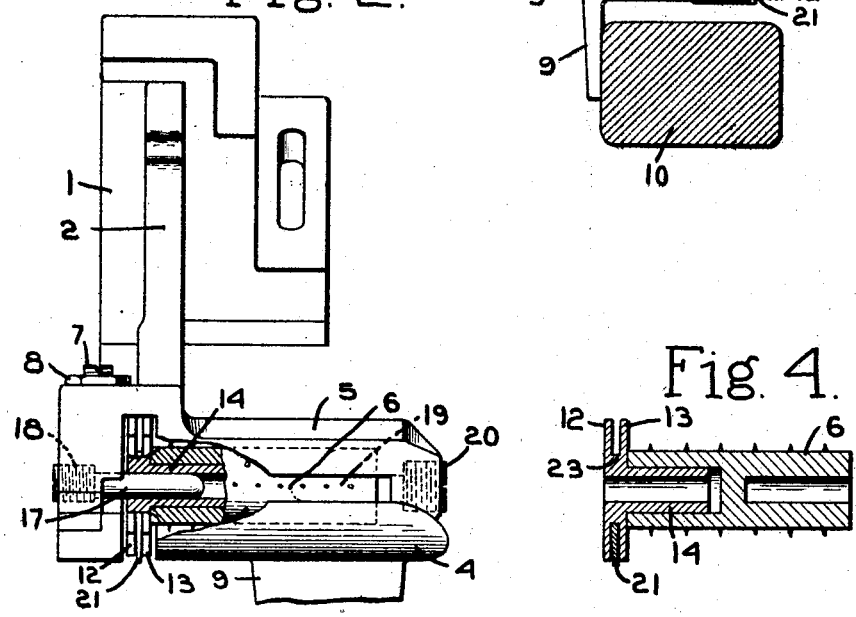
Fig. 2 is a view looking at the rearward end of the construction shown in Fig. 1, portions of the pod and cap being broken away and portions of the wooden thread cutting roll and sleeve of the rotatable cutter being shown in section.
Figure 4:
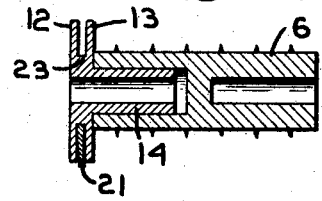
Fig. 4 is a longitudinal sectional view of the thread cutting roll, the rotatable cutter and the cooperating stationary cutter.

The thread cutting temple illustrated comprises a temple stand 1 mounted on some fixed part of the loom, such as the breast beam, and a shank 2 which slides yieldingly in the stand and terminates at its rearward end in the head portion 3 in which are located the operative parts of the temple. These temples are located at both sides of the loom and are consequently right and left-handed, the one illustrated being that at the right-hand side of the loom.

The lower portion of the temple head presents an inwardly projecting pod 4 and above and parallel therewith an inwardly projecting cap 5. The cap and pod are separated to allow for the passage of the cloth being woven and the usual pin-studded roll 6 is mounted upon suitable spindles within the cap.

The cap and pod portions of the temple head are made in separate pieces and joined together at the outer side beyond the line of passage of the cloth. At the forward upper portion of the head this joint between the pod and cap usually extends substantially horizontally and a screw 7 passed through the cap and threaded into the pod and having thereupon a lock nut 8 is ample to secure the cap and pod rigidly together. The head of the temple is provided with a downwardly extending heel 9 which may be, and usually is, engaged by the lay 10 upon its beat-up and the temple forced forwardly thereby as the lay reaches the limit of its movement. Thus the shank 2 is forced forwardly into the temple stand by the lay and is returned to its normal position by a suitable spring 11 which surrounds a reduced portion of the temple shank and abuts at one end against the end of the temple stand and at the other against a shoulder upon the shank 2.

The construction thus described is that of the usual loom temple. The present invention comprises the provision of a novel rotatable toothed thread cutting member and a cooperating stationary thread cutting member so arranged as to engage and sever the filling end after an abandoned shuttle has been discharged by the action of the transferring mechanism.

In the operation of the usual filling replenishing loom, the shuttle feeler thread cutter engages the filling end extending to the bobbin about to be discharged, swings it forwardly and holds it until the filling end running from the selvage of the cloth to the shuttle feeler thread cutter has been severed by the temple thread cutter. Thus the filling end is retained in a taut position until engaged and severed by the temple thread cutter.

The present invention comprises the provision of a novel rotatable thread cutter and a cooperating fixed or stationary thread cutter so constructed as effectively to sever the filling end in close proximity to the selvage of the cloth, the rotation of the rotatable member being caused by the relative movement between the web of cloth and the temple head.

In the preferred construction illustrated in the drawing, the rotatable thread cutter consists of a plurality, preferably a pair, of parallel disks 12, 13 each preferably formed integral with a sleeve 14 which is inserted axially into a suitable recess in one end of the usual wooden pin-studded temple roll 6 and fixedly secured therein. Such a thread cutting member can be readily and accurately machined and, being an integral construction, there can be no relative movement between the disks or between either disk and the sleeve. The disks 12, 13 desirably are provided with coincident teeth 15 and 16 which preferably are undercut so that the teeth present a hooked contour. A suitable stud 17 extending into the bore of the sleeve 14 and provided with a screw threaded head 18 engaging complementary screw threads in the outer end of the cap and serves as a journal for the outer end of the temple roll and rotatable cutter. The opposite end of the temple roll is bored to receive a stud 19 having an enlarged screw threaded head 20 which engages complementary screw threads in the wall of the opposite or inner end of the temple head.

The stationary cutter which cooperates with the rotatable disk cutters desirably is in the form of a flat blade 21 which is located in a substantially vertical position and has a cylindrical recessed portion 22 which conforms substantially to the cylindrical hub 23 intermediate of the parallel disks 12 and 13. The blade 21 has a vertical upward and forward extension 24 which is offset at right angles at its upper end providing a shank 25 adapted to extend into the horizontal joint between the cap and the pod. The shank portion 25 of the blade is provided with an aperture 26 through which the screw threaded stud 7 extends. When therefore the shank 26 of the stationary blade is clamped between the cap and the pod, the blade is held in a rigid position inasmuch as it extends between the disks and fits closely therebetween. The stationary blade aids in preventing movement of the temple roll in the direction of its axis. The rearward end of the blade 21 extends upwardly into substantially the plane of the web of the cloth and is provided with a horizontal thread engaging portion 27 which presents sharp edges or corners 28, 29 which cooperate respectively with the teeth 15 and 16 of the cutting disks 12 and 13. The blade desirably is slightly tapered from the horizontal edge portion 27 toward the back of the blade to insure proper clearance, but the upper edge of the blade should present a substantially close fit between the adjacent faces of the cutting disks.

Figure 3:
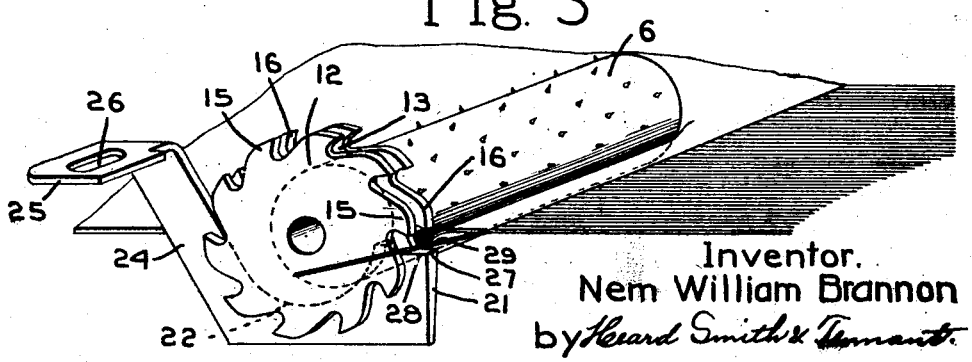
Fig. 3 is a diagrammatic perspective view of the tooth-studded temple roll, the rotatable cutters thereto attached and the relation of the web of fabric thereto during the weaving operation.

In the operation of the device the engagement of the pin studs of the temple roll with the web of the cloth causes the rotation of the roll upon any relative movement between the cloth and the temple head. Such relative movement of the cloth alone as it is drawn by the tension roll and wound upon the cloth roll of the loom. The relative movement may also be caused by the movement of the temple thread cutter as its heel is struck by the lay. In such case, the temple roll and thread cutting disks are rotated in a backward or counter-clockwise direction from the position shown in Fig. 3 of the drawing and upon return of the temple thread cutter to its normal position by the action of the spring 11, the temple roll and cutters will be rotated in a clockwise direction. If the filling end from the selvage to the cloth to the shuttle feeler thread cutter is engaged by the rotating teeth of the temple in the clockwise rotation of the cutting disks, it will be forced against the stationary cutting blade simultaneously by coincident teeth of both of the disks and severance insured, as the teeth of both disks are in cooperative cutting relation to the approximate edge of the stationary thread cutter. Thus complete severance of the filling end is insured.

If the cutting edges of the stationary blade become worn, the blade can be readily removed for sharpening or replacement by merely unscrewing the stud 7, which secures the cap and the pod with the shank of the stationary cutting blade therebetween.

Desirably the cutting portion 27 of the stationary cutting blade is slightly inclined downwardly and forwardly at the end to aid in drawing the filling end toward the bases of the teeth of the filling cutters. The shoulder of the filling ends of this inclined portion also prevents fibres of the filling end from being drawn further toward the axis of the rotatable cutting disks. By reason of the construction above described, it will be obvious that an efficient temple thread cutter is provided in which the movable cutting blades are actuated by the rotation of the temple roll and the necessity of special mechanism for actuating the movable blade usually found in temple thread cutters eliminated, with the consequent elimination of parts and simplification in construction. The cutting mechanism of the present invention may be made of rigid construction and long life and efficiency thereby insured.

Having thus described the invention, what is claimed as new, and desired to be secured by Letters Patent, is:

1. A thread cutting temple for looms comprising a roll having means to engage the web of cloth and rotatable by relative movement between the cloth and the temple, a plurality of parallel toothed cutting disks rotatable by said roll and co-operating stationary cutting means closely fitting therebetween and presenting edges co-operating with the teeth of the respective cutting disks to sever the filling ends engaged thereby.

2. A thread cutting temple for looms comprising a roll having means to engage the web of cloth and rotatable by relative movement between the cloth and the temple, a pair of parallel cutting disks rigidly connected to said roll and rotatable therewith and provided with coincident pairs of teeth and a stationary blade closely fitting between said disks and presenting edges co-operating with the respective teeth thereof to sever the filling engaged thereby.

3. A thread cutting temple for looms comprising a roll having means to engage the web of cloth and rotatable by relative movement between the cloth and the temple, a cutting member comprising a pair of parallel toothed cutting disks having an integral sleeve extending axially into said roll and fixedly secured therein and a stationary cutting blade closely fitting between said disks and presenting edges co-operating with the respective teeth thereof to sever the filling end engaged thereby.

4. A thread cutting temple for looms comprising a roll having means to engage the web of cloth and rotatable by relative movement between the cloth and the temple, a rotatable cutting member comprising a pair of cutting disks having an integral sleeve extending axially into said roll and fixedly secured therein, and having coincident under-cut teeth and a stationary blade closely fitting between said cutting disks and presenting substantially horizontal edges located in proximity to the plane of the web of cloth and co-operating with the respective teeth of the cutting disks to sever the filling end engaged thereby.

5. A thread cutting temple for looms comprising a pod and a cap jointed together transversely at the forward portion of the head, a roll rotatably mounted in said cap having means to engage the web of cloth and rotatable by relative movement between said cloth and temple, a pair of integral parallel cutting disks, fixedly secured to said cutting roll having coincident teeth and a vertical stationary cutting blade extending beneath and closely fitting between said cutting disks and presenting cutting edges co-operating with the teeth of the respective disks and having an offset shank seated between said cap and pod and means for rigidly securing together the cap, pod and interposed shank.

In testimony whereof, I have signed my name to this specification.

NEM WILLIAM BRANNON.